Figure 1:
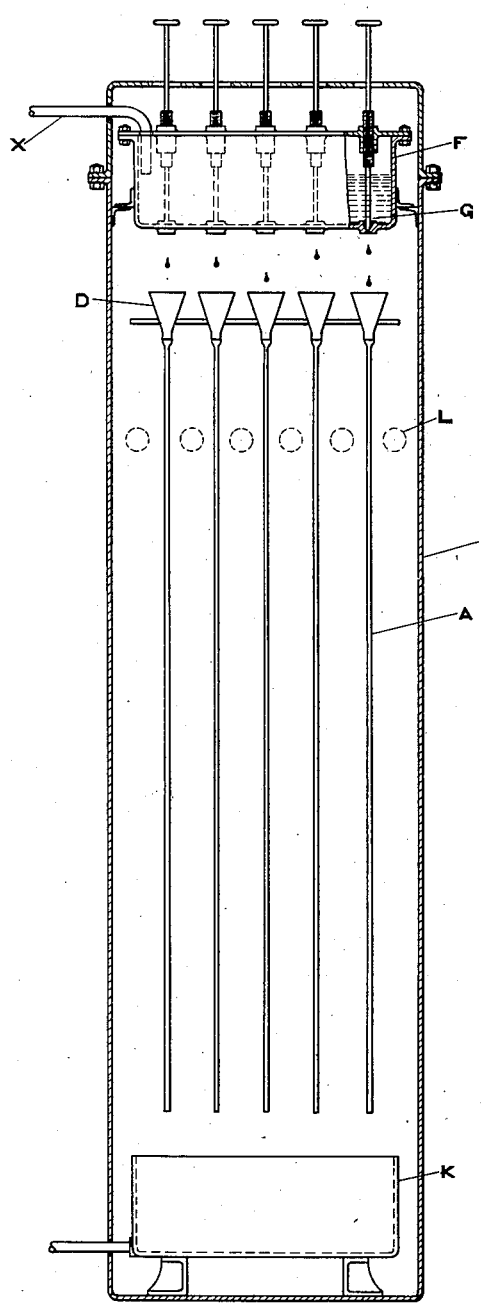

Nov. 28, 1933. C. H. LILLY 1,936,983
PROCESS OF MOLD FERMENTATION AND APPARATUS THEREFOR
Filed March 4, 1931

Cecil Herbert Lilly, INVENTOR

By His Attorney

Patented Nov. 28, 1933

1,936,983

UNITED STATES PATENT OFFICE 1,936,983

PROCESS OF MOLD FERMENTATION AND APPARATUS THEREFOR

Cecil Herbert Lilly, Saltcoats, Scotland, assignor to Imperial Chemical Industries Limited, a corporation of Great Britain Application March 4, 1931, Serial No. 520,063, and in Great Britain March 5, 1930

10 Claims. (Cl. 260—120)

This invention relates to the technical application of molds and other film-forming or surface-growing organisms, such as yeasts and bacteria, in the production of valuable products of metabolism, e.g. from carbohydrates. Amongst such products of metabolism may be mentioned citric acid, gluconic acid, fumaric acid, mannitol, but the invention is not restricted to these. The invention relates particularly to improvements in apparatus or plant suitable for such technical applications.

The principle of the reactions is that a "felt" or film of the particular mold or organism is developed on the surface of the nutrient (e. g. carbohydrate) medium—usually a liquid. The reaction between the organism and the liquor depends upon contact between the under surface of the felt and the upper surface of the liquor, and unless the products of metabolism are prevented from unduly accumulating at the point of contact the reaction becomes retarded and the conversion inefficient. The speed of the reaction, however, may be increased by presenting a fresh surface of liquor to the felt, or maintained by preventing undue local concentration of the products, and this has hitherto usually been effected by agitating the liquor or causing it to flow below the surface of the felt. Such circulation of the liquor must be very carefully manipulated in order to avoid disruption or submergence of the felt, which would interrupt the reaction. Usually the felt and nutrient medium are contained in shallow trays, and after the particular batch of liquor has been converted into the product desired, depending upon the particular organism employed and the conditions under which it is cultivated, the liquor is removed for subsequent treatment and fresh liquor is introduced under the surface of the felt for further action. This operation is sometimes effected by arranging the trays in tiers and causing the liquor to flow under the felt from one tray to another. As a rule, however, even the employment of shallow trays results in a relatively large bulk of liquor of small surface area being in contact at any one time with a correspondingly small surface area of felt. It is highly desirable that as large a surface of felt as possible should be in contact with a relatively thin film of liquor, and to effect these conditions with shallow trays necessitates the construction of a somewhat cumbersome plant for a relatively small output of product.

The object of the present invention is the improved designing of plant of reasonable and convenient dimensions for the technical application of molds or other film forming or surface growing organisms, provision being made for a continuously changing surface of liquor without disrupting the felt, for contact between the liquor and the felt, and for the presentation of as large a surface of felt to liquor as possible.

According to my invention these objects are achieved by allowing the liquor for treatment to flow through a series of porous-walled tubes, the organism being developed on the outer surface B of the unit, i. e. the surface in contact with the air, whilst the liquor passes along the inner or hollow part of the unit in a relatively thin film in contact with the under surface of the felt at such a rate that conversion of the carbohydrate or other fermenting matter takes place during its passage through the unit.

In one form of unit according to my invention a length of porous material such, for instance, as filter cloth or other suitable fabric is formed into a long flattened tube open at the ends, and suspended or supported in such a way as to encourage cohesion of the inner walls of the tube throughout (or for the greater part of) its length. The cross-section of the tube may thus take the form of a very elongated ellipse, including the limiting case where the two long sides of the ellipse are actually in contact, but alternative designs are equally within the scope of my invention. The tubes may be made of flexible material, such as filter-cloth and the like, or of non-flexible material, such as clay, earthenware, etc., so long as a suitable outer surface B for the growth of the felt is provided.

Figure 2:
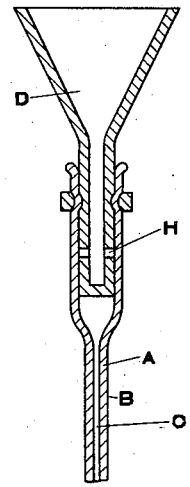
Figure 3:
Figure 4:
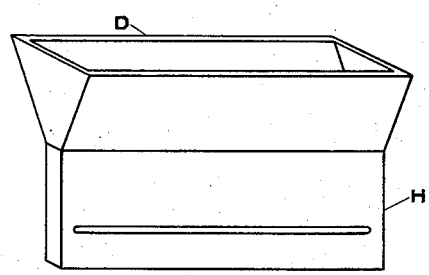

As an example of the assembling of units to form a complete apparatus for the cultivation of a mold or other suitable organism and for the conversion of the nutrient medium we give the following description, illustrated in Figures 1, 2, 3, and 4 of the drawing accompanying this specification, but it is understood that this example is illustrative and I do not limit myself to any particular design. Tubes A, of filter-cloth are attached at one of their open ends to Y-shaped troughs D, suitably supported in a cabinet or tower E, of such dimensions as will accommodate a number of these tubular cloths in a vertical position a few inches apart.

Above the troughs, and situated either within or without the cabinet or tower is supported a receiver or constant-level tank F, for the sterile medium supplied from an external source. Adjustable orifices or valves G, are provided in this receiver to regulate the supply of medium to each of the troughs D.

In order to ensure even distribution of liquor over the width of the tubular material A, attached to the limb of the Y-shaped trough D, the opening at the bottom of the limb may be constricted, or, alternatively, entirely closed, in which case lateral openings H, are made at both sides of the limb.

The width of the bottom limb of the Y-shaped trough D, is adjusted so as to encourage cohesion of the inner surfaces, C of the cloth tube throughout its length. In this manner not only is the liquor passing reduced to a relatively thin film on the inner walls C of the tubes, but restricted aeration discourages development of organisms within the tube during the period in which it is desired to encourage development of felt on the outer surfaces B.

At the base of the tower is placed a receiver K, which collects the liquor that has passed through the tubes A, and passes it to an external receiver for recirculation, either through the same tower or any number of similar towers. Before recirculating the liquor the products of metabolism resulting from its first passage through the plant may be wholly or partly removed if desired.

The tower is provided with sealed inspection windows and with openings L, through which the cloths, following sterilization of the whole apparatus, may be inoculated with spores or organisms of the desired type. This inoculation may be effected by causing a suspension of dry mold spores in the atmosphere within the tower, or by spraying the organisms suspended in a suitable liquid, or by any other suitable means. The tower is provided with open-steam supply for sterilizing and closed-steam or other suitable means for heating, and with sterilized air supply. Air may be supplied to the outer surface B or to the inner surface C or both, of the tubular cloths A, and the contents of the tower or cabinet may be maintained at normal pressure or at any desired pressure above or below atmospheric.

The tower may be constructed of sheet metal or other suitable material, but it is necessary to ensure that precautions are taken to prevent entry of extraneous organisms from the atmosphere. It is further desirable that all metal parts coming in contact with the liquor should be of acid resisting material and have no influence upon the particular product that it is desired to manufacture.

As illustrating the manner in which the plant is operated the following example is given:

The various component parts of the unit having been assembled and sterilized in the known manner, a suspension of mold spores from a pure culture previously prepared in the laboratory is introduced in the form of a spray, or alternatively in powder form through the openings L so as to inoculate the outer surfaces B of the cloths or tubular material A. Suitable cultivation media for growth and development of the particular species of mold chosen are then introduced into the inner surface B, of the tubular material A via the constant level tank F, the valves G, and the troughs D, the liquid cultivation medium being introduced as a continuous flow, or discontinuously and at frequent intervals, pending the development of a mold "felt" covering the whole of the outer surfaces B of the tubular material A. The time occupied in the formation of suitable "felts" depends upon the species employed, and this in turn upon the product ultimately desired, but it is assumed that the optimal conditions for the development of the particular organism as regards cultivation medium, temperature, air supply &c. have been pre-determined in the laboratory. Working with certain species of Aspergilli my experience shows that satisfactory "felts" are formed within two to three days.

When it is decided that the "felts" are sufficiently formed, the cultivation medium may, if desired, be replaced by another, which restricts further development of the "felt" without necessarily or unduly retarding its enzymic activity in respect of the product of metabolism that it is desired to manufacture. A continuous or discontinuous flow of the medium is maintained through C of the tubular material A until the mold "felts" require renewal through exhaustion or through becoming too thick to permit of economic production of the metabolic material desired.

The quantity of medium allowed to flow into the troughs D must be such as will ensure as even a distribution of liquid over the whole width of the tubular material A as possible, and this will vary with the size of unit and, consequently, the width of the tubular material employed. The length of the tubular material A should be as great as possible to ensure appreciable contact time between liquid and "felt" and thus reduce as far as posible the number of times it is necessary to recirculate the medium to secure its complete conversion to the desired product. It has been found advantageous to attach a suitable filter to the exit pipe of the receiving tank K in order to prevent small particles of detached "felt" finding their way into the supply and constant-level tanks when recirculating the liquid.

As an additional precaution against stray organisms or spores finding their way into the supply tank and pipe system, the liquor leaving the receiving tank (K) may be passed through a suitable coil heated to a degree commensurate with the thermal death-point of the species of organism employed, the coil being of sufficient length to ensure a contact time that will result in sterilization of the liquor before recirculation.

It is understood that the temperature employed in the unit and the air supply are predetermined in the laboratory, and may vary according to the species of organism employed and the nature of the product that it is desired to manufacture.

The plant and process described are capable of numerous applications, and may be used, for example, in the production of citric acid by the fermentation of carbohydrates with various species of molds.

As many apparently widely different embodiments of this invention may be made without departing from the spirit and scope thereof, it is to be understood that I do not limit myself to the specific embodiments thereof except as defined in the appended claims.

I claim:

1. Apparatus for use in mold fermentation which comprises a plurality of porous walled flat tubes, long in proportion to their cross-section, suspended within an outer casing closed to the outside air, means for passing sterilized air through said casing, means for inoculating the outer surface of said tubes with felt forming organisms, means for circulating through said tubes a regulated stream of sterilized nutrient liquor and means for withdrawing liquor from the bottom of said casing.

2. Apparatus according to claim 1 in which the tubes are composed of porous fabric material.

3. Apparatus according to claim 1 in which the tubes are composed of canvas.

4. Apparatus according to claim 1 in which the tubes are composed of porous earthenware.

5. Apparatus for use in mold fermentation which comprises a plurality porous walled flat tubes, long in proportion to their cross-section, suspended within an outer casing closed to the outside air, means for passing sterilized air through said casing, means for inoculating the outer surface of said tubes with felt forming organisms, means for circulating through said tubes a regulated stream of sterilized nutrient liquor, means for withdrawing liquor from the bottom of said casing, and means for effecting the pre-sterilization of the apparatus.

6. Apparatus for use in mold fermentation which comprises a plurality of porous walled flat tubes, long in proportion to their cross-section, suspended within an outer casing closed to the outside air, means for passing sterilized air through said casing, means for inoculating the outer surface of said tubes with felt forming organisms, means for circulating through said tubes a regulated stream of sterilized nutrient liquor, means for withdrawing liquor from the bottom of said casing, and means for heating the apparatus to a fermentation temperature.

7. A mold fermentation process which comprises passing by gravity flow a regulated stream of sterilized nutrient liquor containing fermentable carbohydrate through the inside of a flat porous walled tube, the outer surface of which is aerated and inoculated with felt forming organisms.

8. A mold fermentation process which comprises passing by gravity flow a stream of sterilized nutrient liquor containing fermentable carbohydrates through the inside of a flat porous walled tube, the outer surface of which is aerated and inoculated with felt forming organisms, said stream of nutrient liquor being so regulated that a substantial degree of fermentation takes place during passage through the tube but is not so slow that a substantial proportion of the fermentation product is destroyed.

9. The process according to claim 7 in which the tube is inoculated with a citric acid producing mold whereby to effect fermentation of the carbohydrate to citric acid.

10. The process according to claim 8 in which the tube is inoculated with a citric acid producing mold whereby to effect fermentation of the carbohydrate to citric acid.

CECIL HERBERT LILLY.